United States Patent
Kempf et al.

(10) Patent No.: US 7,587,935 B2
(45) Date of Patent: Sep. 15, 2009

(54) ELECTRONIC UNIT FOR MEASURING OPERATING PARAMETERS OF A VEHICLE WHEEL, COMPRISING AN ELECTRONIC BOX AND AN INFLATION VALVE OF THE SNAP-IN TYPE

(75) Inventors: Christian Kempf, Toulouse (FR); François Gory, Tournefeullle (FR); Franz Hillenmayer, Burglengenfeld (DE)

(73) Assignee: Continental Automotive France, Toulouse (FR)

( * ) Notice: Subject to any disclaimer, the term of this patent is extended or adjusted under 35 U.S.C. 154(b) by 0 days.

(21) Appl. No.: 12/128,393

(22) Filed: May 28, 2008

(65) Prior Publication Data
US 2009/0007649 A1 Jan. 8, 2009

Related U.S. Application Data
(60) Provisional application No. 60/958,779, filed on Jul. 9, 2007.

(30) Foreign Application Priority Data
Jul. 6, 2007 (FR) .................................. 07 04914

(51) Int. Cl.
B60C 23/02 (2006.01)
(52) U.S. Cl. ...................................... 73/146.8; 73/146
(58) Field of Classification Search ......... 73/146–146.8
See application file for complete search history.

(56) References Cited

U.S. PATENT DOCUMENTS 6,005,480 A * 12/1999 Banzhof et al. ............. 340/447
6,163,255 A * 12/2000 Banzhof et al. ............. 340/447
6,629,454 B2 * 10/2003 Lundqvist ................... 73/146.8
6,647,772 B2 * 11/2003 Ito et al. ....................... 73/146
6,722,409 B1 * 4/2004 Martin ........................ 152/427
6,774,775 B2 * 8/2004 Ito ............................... 340/442
6,799,455 B1 * 10/2004 Neefeldt et al. ............... 73/146
6,851,308 B2 * 2/2005 Fonteneau .................... 73/146
6,895,810 B2 * 5/2005 Saheki et al. ............... 73/146.8
7,281,421 B2 * 10/2007 Yin et al. .................... 73/146.8
7,284,418 B2 * 10/2007 Yin et al. .................... 73/146.8
7,421,902 B2 * 9/2008 Sheikh-Bahaie et al. ...... 73/700
2006/0272402 A1 12/2006 Yin et al.
2006/0272758 A1 12/2006 Yin et al.

FOREIGN PATENT DOCUMENTS

EP 1 736 328 A1 12/2006

* cited by examiner

Primary Examiner—Andre J Allen
Assistant Examiner—Jermaine Jenkins
(74) Attorney, Agent, or Firm—Young & Thompson

(57) ABSTRACT

An electronic unit for measuring operating parameters of a vehicle wheel, includes an electronic box (1), an inflation valve (2) of the snap-in type composed of a valve body (3) made of an elastomer material provided with an axial bore housing a hollow tubular core (15), and elements for securing the electronic box (1) and the inflation valve (2). The elements for securing the electronic box (1) and the inflation valve (2) include a bushing (20) secured to the electronic box (1) and adapted to be slidably mounted around a portion of the tubular core (15) which extends as a continuation of the valve body (3) and into a position of the electronic box (1) where the latter extends as a direct continuation of the inflation valve (2), and members (13, 25, 26) for assembling the bushing (20) of the electronic box (1) on the valve body (3).

20 Claims, 2 Drawing Sheets

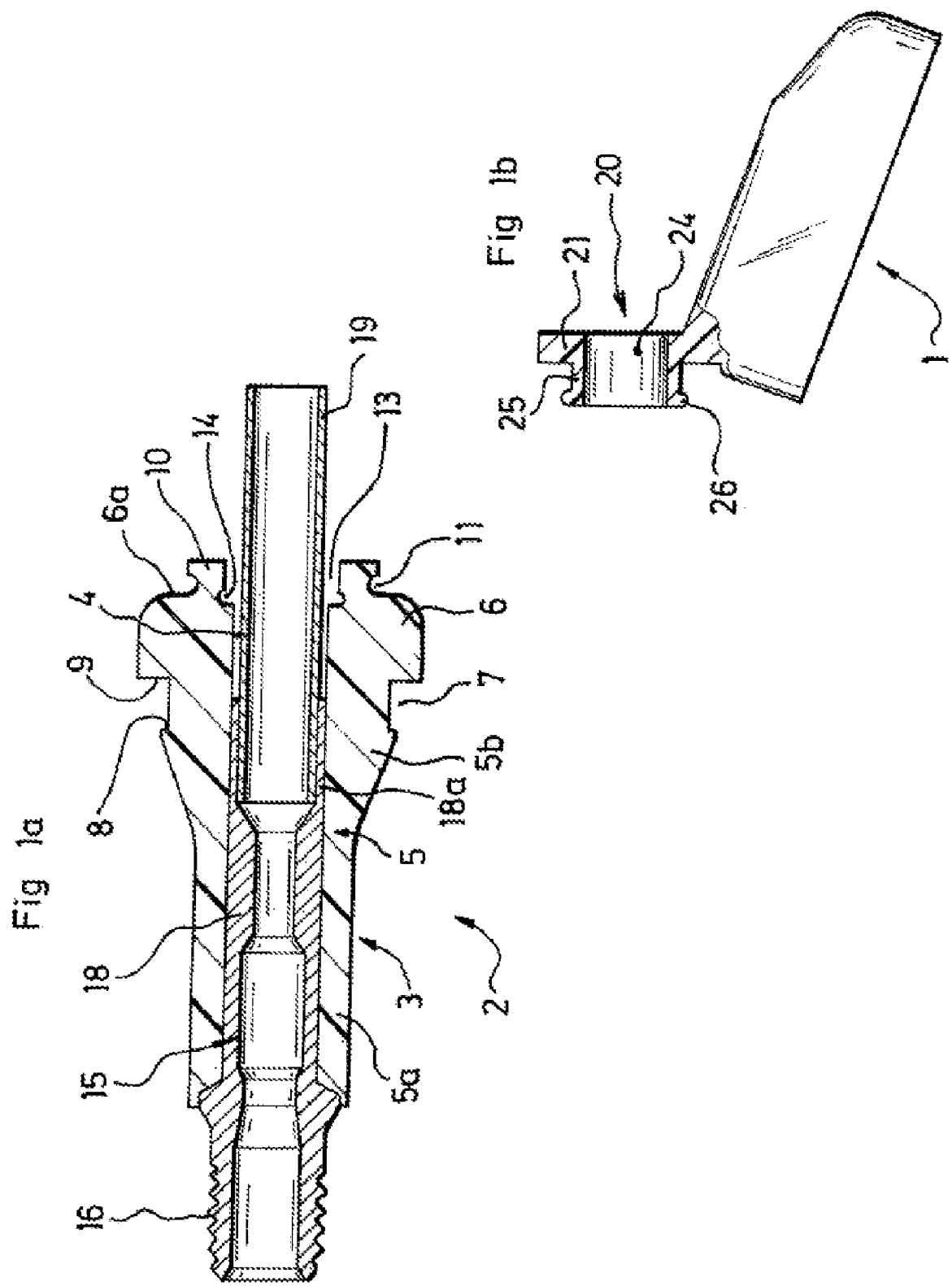

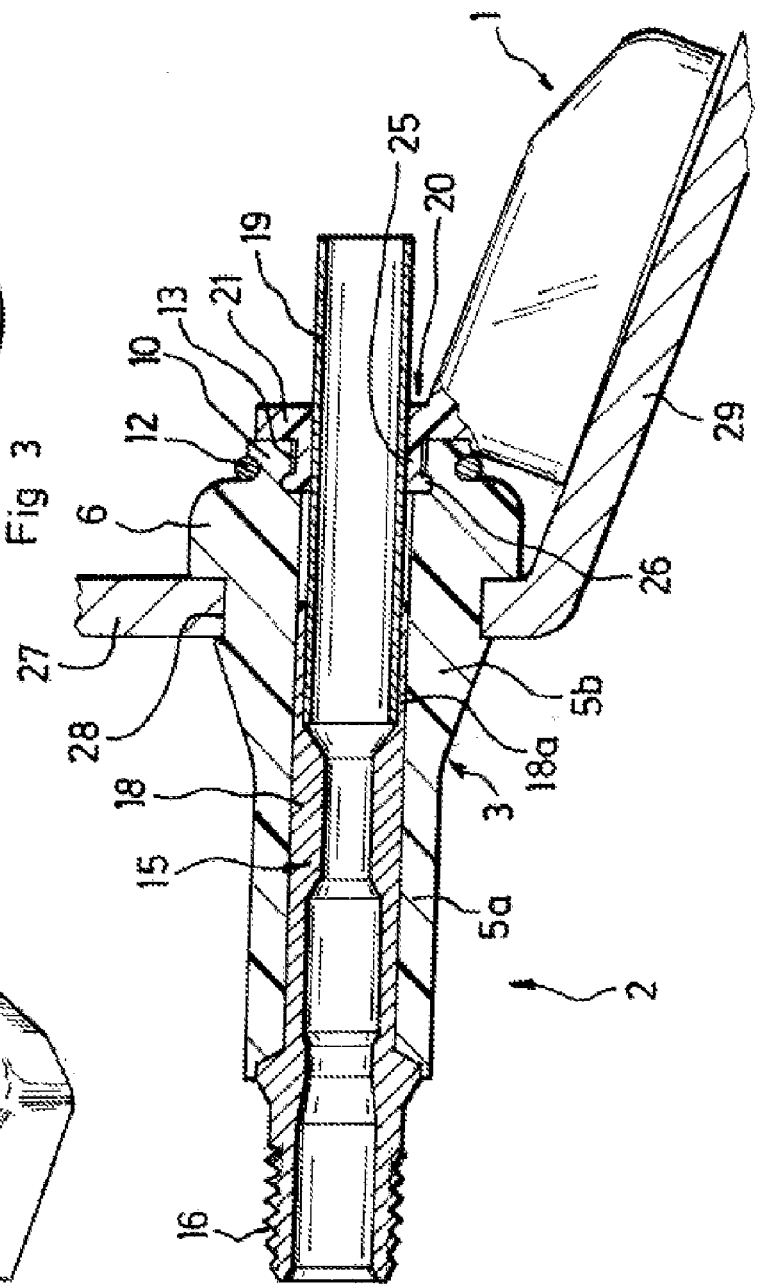

ELECTRONIC UNIT FOR MEASURING OPERATING PARAMETERS OF A VEHICLE WHEEL, COMPRISING AN ELECTRONIC BOX AND AN INFLATION VALVE OF THE SNAP-IN TYPE

The invention relates to an electronic unit for measuring operating parameters of a vehicle wheel, comprising an electronic box and an inflation valve of the snap-in type which makes it possible to secure said electronic box on a wheel rim.

More and more motor vehicles have systems, comprising sensors, for monitoring and/or measuring parameters.

As an example of such systems, mention may be made of the systems used to monitor tire pressure that comprise electronic boxes mounted on each of the vehicle wheels, dedicated to measuring parameters, such as pressure and/or temperature of the tires equipping these wheels, and intended to inform the driver of any abnormal variation in the parameter measured.

One of the most commonly used current solutions for fastening electronic boxes on the rims of the wheels consists in producing electronic units each composed of an electronic box and an inflation valve assembled together with said electronic box. The inflation valve also makes it possible to secure the electronic box on the rim of the wheel.

A first solution concerning such electronic units consists in producing specific inflation valves capable of transmitting the forces to which the electronic boxes are subjected. However, this solution proves to be costly since, apart from the high price of the inflation valves, generally made completely of metal, it requires the production of supplementary parts (nuts, seals, etc.) specially designed to ensure a leaktight fastening of the inflation valves on the rims.

To overcome this drawback, a second solution consisted in producing inflation valves of the same basic design as the conventional inflation valves of the snap-in type but modified so as to absorb the forces to which the electronic boxes are subjected.

This solution particularly resulted in the production of an electronic unit as described in U.S. Pat. No. 6,005,480 comprising an inflation valve of the snap-in type comprising:

- a valve body made of an elastomer material, provided with a longitudinal axial bore and intended to extend through an orifice formed in the rim, said valve body being composed of an elastically deformable base and of a head which butts against the rim and is separated from the base by a neck adapted to be positioned in a sealed manner in the orifice formed in said rim,
- and a hollow tubular core made of a rigid material, housing a closure mechanism and having dimensions adapted for lodging in the bore of the valve body and for extending as a continuation of said valve body on either side thereof, said tubular core consisting of two longitudinal sections arranged with respect to one another and relative to the valve body in such a way as to allow an elastic deformation of the base whereby the inflation valve can be mounted through the orifice in the rim.

Furthermore, the electronic unit comprises means for securing the electronic box and the inflation valve that are adapted for fastening said electronic box on that portion of the tubular core of the inflation valve which extends as a continuation of the abutment head of the valve body.

According to this principle, the tubular core housed in the valve body is designed to absorb the forces to which the electronic boxes secured on this core are subjected, and the modifications made to the conventional inflation valves of the snap-in type for the purpose of obtaining this result are minimal and hence inexpensive.

However, it is found that this design leads to a significant limitation in the performance levels, in terms of sealing and durability, of the inflation valves.

Specifically, the design of the means for securing the electronic box and the inflation valve that leads to the electronic box being secured on the tubular core of the inflation valves requires that a free space be formed between the abutment head of the valve body and said electronic box: in fact, there must be such a free space so that, when mounting the inflation valve equipped with an electronic box, the base of the valve body is allowed to deform axially and radially in order to insert it and pass it through the orifice in the rim.

However, such a free space results in the position of the center of gravity of the inflation valve/electronic box assembly being significantly offset with respect to the position of the center of gravity of an inflation valve on its own, consequently making it necessary to modify the surface regions of the inflation valve that provide sealing, and increasing the stresses applied in the contact regions between the inflation valve and the rim.

In practice, these modifications and increases in the stresses to which the inflation valves are subjected result, as mentioned above, in a significant limitation in the performance levels, in terms of sealing and durability, of said inflation valves.

The present invention aims to overcome these drawbacks, its main objective being to provide an electronic unit designed in such a way that the stresses to which the inflation valves are subjected are similar to those acting on an inflation valve not provided with an electronic box.

Accordingly, the invention is aimed at an electronic unit comprising an electronic box, an inflation valve of the snap-in type as described above, and means for securing the electronic box and the inflation valve, comprising:

- a bushing secured to the electronic box and adapted to be slidably mounted around that portion of the tubular core which extends as a continuation of the abutment head of the valve body and into a position of the electronic box where the latter extends as a direct continuation of the inflation valve,
- and means for assembling the bushing of the electronic box on the abutment head of the valve body.

According to the invention, and foremost, the forces acting on the electronic box are transmitted, via the bushing, to the tubular core of the inflation valve, the design of this core thus proving to give rigidity to said inflation valve.

Furthermore, the electronic box is:

- assembled directly on the abutment head of the valve body (without a free space) such that the position of the center of gravity of the inflation valve/electronic box assembly is optimized whatever the thickness of the rim,
- slidably mounted relative to the tubular core so as to allow the relative displacements between these two elements when mounting the inflation valve on a rim, without requiring a free space.

Owing to these specific features, and in practice, the electronic unit according to the invention makes it possible to guarantee that the inflation valve has a similar behavior to a traditional inflation valve of the snap-in type.

According to a first advantageous embodiment of the invention, the tubular core of the inflation valve consists of two longitudinal sections secured as a continuation of one another in the region of the neck of the valve body:

a first longitudinal section secured to the valve body inside the bore thereof, extending within the base of said valve body and as a continuation of said base, and a second longitudinal section free to move translationally inside the bore of the valve body, extending within the abutment head of said valve body and as a continuation of said abutment head.

Furthermore, the second longitudinal section of the tubular core then has, advantageously, a smaller external diameter than the first longitudinal section of said tubular core, adapted to secure said longitudinal sections with a force fit.

In addition, the bore of the valve body has advantageously, inside the abutment head, an internal segment having dimensions adapted to form an annular space around the second longitudinal section of the tubular core, allowing the displacements (sliding) between the latter and the abutment head.

Moreover, the means for assembling the bushing of the electronic box on the abutment head of the valve body advantageously comprise, according to the invention:

an annular chamber formed within the abutment head of the valve body in the region of the outlet of the bore, a hollow sleeve secured to the bushing of the electronic box and having dimensions adapted for lodging in the annular chamber, and mating elements for preventing relative translational movement of the bushing relative to the valve body, these elements being formed on the sleeve and inside the annular chamber.

Furthermore, in order to ensure that the assembly of the bushing of the electronic box on the abutment head of the valve body is locked, this abutment head advantageously forms, around the periphery of the annular chamber, a cylindrical end-piece having an external annular groove housing a spring locking ring.

According to another advantageous embodiment of the invention, the electronic box and the bushing are arranged such that said electronic box is inclined by an angle of around 10° to 40° with respect to the longitudinal axis of the valve body. Such an inclination makes it possible to keep the electronic boxes substantially in contact with the bottom of the rims (for a large range of commercially available rims) and thus limit the stresses applied.

Other features, objects and advantages of the invention will become apparent from the detailed description which follows with reference to the appended drawings which, by way of nonlimiting example, represent a preferred embodiment of the invention. In these drawings:

FIG. 1a is a longitudinal section through an axial plane A of FIG. 2, representing an inflation valve according to the invention, FIG. 1b is a longitudinal view, partially in section through the longitudinal plane A, of an electronic box according to the invention, FIG. 2 is a perspective view of an electronic unit according to the invention, FIG. 3 is a longitudinal section through the axial plane A representing this electronic unit mounted on a wheel rim, and FIG. 4 is a schematic view illustrating a variant embodiment of the bushing according to the invention.

The electronic unit according to the invention, represented by way of example in the figures, is intended to be mounted on a wheel of a vehicle for the purpose of measuring operating parameters (pressure, temperature, acceleration, etc.) of said wheel, and transmitting the measured data to a central processing unit (not shown) mounted on the vehicle.

This electronic unit is composed of an electronic box 1 (FIG. 1b) adapted to be mounted inside the casing of a tire, and of an inflation valve 2 (FIG. 1b) for securing said box on the rim of the wheel equipped with this tire.

Firstly, the inflation valve 2 consists of a snap-in inflation valve comprising a valve body 3 made of an elastomer material and provided axially with a cylindrical longitudinal bore 4.

In a conventional manner, this valve body 3 is additionally subdivided, longitudinally, into a base 5 and an abutment head 6 which is separated from the base 5 by a neck 7.

Furthermore, the base 5 is composed of two longitudinal sections whose shapes are adapted so as to provide said base with longitudinal and radial elastic deformation capabilities: a first, longer, end section 5a of cylindrical or slightly frustoconical shape, and a second section 5b of frustoconical shape having a larger vertex angle than the first section 5a.

The abutment head 6 for its part is generally cylindrical in shape and has, according to the invention, a front face 6a from which there extends an axial cylindrical end-piece 10 whose diameter is smaller than said abutment head, a space (for example an annular groove) 11 being formed in the peripheral wall of said end-piece and being designed to house a spring ring 12 (FIG. 3) of the circlip type or any similar device capable of compressing the cylindrical end-piece 10 on the bushing 20.

The neck 7 of this valve body 3 has, finally, the form of an annular indentation bounded by two shoulders 8, 9 which form a respective junction with the base 5 and the abutment head 6.

Lastly, the valve body 3 comprises, according to the invention, a cylindrical chamber 13 formed within the cylindrical end-piece 10, in the region of the outlet of the bore 4, with an internal annular groove 14 being formed inside and in the bottom of this chamber.

The inflation valve 2 additionally comprises a hollow tubular core 15 made of a rigid material, having dimensions adapted for lodging in the bore 4 of the valve body 3 and for extending as a continuation of said valve body on either side thereof. This tubular core 15 consists of two separate longitudinal sections 18, 19 secured as a continuation of one another in the region of the neck 7 of the valve body 3.

The first of these longitudinal sections 18 consists of a hollow cylindrical stem 18 of a type known per se, made of brass, for example, and particularly intended to house the closure mechanism (not shown) of the inflation valve 2. This cylindrical stem 18 is secured to the valve body 3, inside the bore 4 of the latter, and extends both internally within the base 5 as far as the neck 7, and externally as a continuation of said base. Furthermore, the section 16 of this cylindrical stem 18 that is situated as a continuation of the valve body 3 has an external thread adapted (in a known manner) to allow a protective cap 17 to be screwed on. It should additionally be noted that, in a customary manner, adhesion between the valve body 3 and the external face of the cylindrical stem 18 can be obtained by producing the valve body 3 by overmolding said cylindrical stem.

According to the invention, the second longitudinal section 19 of the tubular core 15 of the inflation valve 2 consists, for its part, of a cylindrical tube 19 made of a material such as steel which, for an identical thickness, has a greater strength than brass, said cylindrical tube being secured to the end section 18a of the cylindrical stem 18 that is situated in the neck 7, and having a length adapted to extend, internally, within the abutment head 6 of the valve body 3 and, externally, as a continuation of said abutment head.

This cylindrical tube 19 has a smaller external diameter than the internal diameter of the end section 18a of the cylindrical stem 18, adapted to secure said tube in said end section with a force fit. Furthermore, this diameter is, in fact, smaller than the diameter of the bore 4, with the result that, during longitudinal deformations of the base 5, the cylindrical tube 19, which is secured to the cylindrical stem 18 and hence to the base 5, has a freedom to move axially (by sliding) inside the abutment head 6.

The electronic box of this electronic unit is composed, for its part, of a hollow box 1 intended to house the electronics of the electronic unit 1, this box being assigned a bushing 20 which is secured to said electronic box and which is adapted to be slidably mounted along that section of the cylindrical tube 19 which extends as a continuation of the abutment head 6 of the valve body 3 and into a position of the electronic box 1 where the latter extends as a direct continuation of the inflation valve 2.

This bushing 20 comprises a mounting plate 21 which, on the one hand, is arranged with respect to the electronic box 1 such that the latter is inclined by an angle of around 10° to 40° with respect to the longitudinal axis of the valve body 3, and whose connection with said electronic box, on the other hand, is reinforced by two lateral gussets 22, 23 (FIG. 2).

Furthermore, this mounting plate 21 is perforated with a circular orifice 24 whose diameter matches the external diameter of the cylindrical tube 19, a cylindrical sleeve 25 extending around the periphery of this orifice and having dimensions adapted, on the one hand, for sliding along the cylindrical tube 19, and, on the other hand, for lodging in the cylindrical chamber 13.

This sleeve 25 is additionally provided, at its end, with an annular external rib 26 whose shape is adapted for lodging in the annular groove 14 of the cylindrical chamber 13.

The electronic box 1 and the inflation valve 2 of the electronic unit according to the invention are, firstly, assembled by inserting the sleeve 25 in the cylindrical chamber 13 and locking the assembly by means of a spring ring 12 in a position in which the electronic box 1 extends as a direct continuation, without any free space, of the abutment head 6 of the valve body 3, and is inclined by an angle of around 10° to 40° with respect to the longitudinal axis of said valve body 3.

The electronic unit thus produced can then be inserted and installed in an orifice 28 (FIG. 3) formed in a rim 27, by virtue of the radial and longitudinal deformation capabilities of the base 5 of the valve body 3.

It will be noted in particular that the free deformation of the regions of the base 5 when mounting the unit on the rim is facilitated by the existence of the free space 4. This space means that the force required to insert a conventional snap-in valve or a snap-in valve modified according to the present invention (that is to say combined with an electronic box) is substantially the same.

In addition, as this insertion is taking place, the cylindrical tube 19, secured to the cylindrical stem 18 and detached from the abutment head 6, does not in any way impede the deformations of the base 5. In addition, during this insertion, the bushing 20 slides along the section of the cylindrical tube 19. When the snap-in valve has been installed in the orifice in the rim, the bushing 20 remains in direct contact (without any free space) with the abutment head 6.

By contrast, once the electronic unit has been mounted on the rim 27, this cylindrical tube 19 plays an essential role in rigidifying the inflation valve 3.

Furthermore, the position of the center of gravity of the inflation valve 3/electronic box 1 assembly is optimized due to the absence of any space between these two elements, with the result that the electronic unit according to the invention makes it possible to guarantee a similar behavior of the inflation valve 1 to a traditional inflation valve of the snap-in type.

Finally, the inclination of the electronic box 1 additionally makes it possible to keep said electronic box substantially in contact with the groove 29 formed by the bottom of the rim 27, and thus limit the stresses applied.

A variant embodiment of the cylindrical tube 19 is illustrated in FIG. 4. According to this variant embodiment, the cylindrical tube 19' is produced in the form of a spring pin. Thus, the cylindrical tube 19' has a longitudinal slot 31. It is no longer inserted in the cylindrical stem 18 with a force fit, as illustrated above, but by compressing the tube 19' on itself so that it can be installed in the stem 18. This particularly avoids the generation of material chips when fitting it in the cylindrical stem 18, this stem having to remain free of any protuberances since it serves as an air passage. This spring pin 19' (or any other similar spring element) is installed in the stem 18 without producing stresses and avoiding any deterioration caused by friction between the stem 18 and the tube (spring pin) 19'. This makes it possible not to adversely affect the airtightness of this region.

It will be noted that this spring element (pin 19') is pre-stressed as soon as it is inserted in the stem 18, thus ensuring that these two parts are acceptably retained one inside the other.

As is represented in FIG. 4, the bushing 20' can advantageously thus be modified and have, on the sleeve 25', an internal wedge 30 adapted to engage with the slot 31 in the spring pin 19'. In so doing, the engagement between the wedge 30 and the slot 31 in the pin makes it possible to prevent the pin 19' from rotating with respect to the bushing 20' and to the body of the valve 3.

The invention claimed is:

1. An electronic unit for measuring operating parameters of a vehicle wheel, comprising
   an electronic box (1),
   an inflation valve (2) of the snap-in type for securing the electronic box (1) to a wheel rim (27), comprising
   a valve body (3) made of an elastomer material, provided with a longitudinal axial bore (4) and intended to extend through an orifice (28) formed in the rim (27), said valve body being composed of an elastically deformable base (5) and of a head (6) which butts against the rim (27) and is separated from the base (5) by a neck (7) adapted to be positioned in a sealed manner in the orifice (28) formed in said rim,
   and a hollow tubular core (15) made of a rigid material, housing a closure mechanism and having dimensions adapted for lodging in the bore (4) of the valve body (3) and for extending as a continuation of said valve body on either side thereof, said tubular core consisting of two longitudinal sections (18, 19) arranged with respect to one another and relative to the valve body (3) in such a way as to allow an elastic deformation of the base (5) whereby the inflation valve (2) can be mounted through the orifice (28) in the rim (27),
   and means for securing the electronic box (1) and the inflation valve (2),
   said electronic unit being characterized in that the means for securing the electronic box (1) and the inflation valve (2) comprise:
   a bushing (20) secured to the electronic box (1) and adapted to be slidably mounted around that portion of the tubular core (15, 19) which extends as a continuation of the abutment head (6) of the valve body (3) and into a position of the electronic box (1) where the latter extends as a direct continuation of the inflation valve (2), and means (13, 14, 25, 26) for assembling the bushing (20) of the electronic box (1) on the abutment head (6) of the valve body (3).

2. The electronic unit as claimed in claim 1, characterized in that the tubular core (15) of the inflation valve (2) consists of two longitudinal sections secured as a continuation of one another in the region of the neck (7) of the valve body (3):

a first longitudinal section (18) secured to the valve body (3) inside the bore (4) thereof, extending within the base (5) of said valve body and as a continuation of said base, and a second longitudinal section (19) free to move translationally inside the bore (4) of the valve body (3), extending within the abutment head (6) of said valve body and as a continuation of said abutment head.

3. The electronic unit as claimed in claim 2, characterized in that the second longitudinal section (19) of the tubular core (15) has a smaller external diameter than the first longitudinal section (18) of said tubular core, adapted to secure said longitudinal sections with a force fit.

4. The electronic unit as claimed in claim 3, characterized in that the bore (4) of the valve body (3) has, inside the abutment head (6), an internal segment having dimensions adapted to form an annular space around the second longitudinal section (19) of the tubular core (15).

5. The electronic unit as claimed in claim 3, characterized in that the means for assembling the bushing (20) of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (14, 26) for preventing relative translational movement of the bushing (20) relative to the valve body (3), these elements being formed on the sleeve (25) and inside the annular chamber (13).

6. The electronic unit as claimed in claim 3, characterized in that the means for assembling the bushing (20') of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (30, 31) for preventing relative rotational movement of the bushing (20') relative to the valve body (3), these elements being formed on the sleeve (25') and on the second elastic longitudinal section (19').

7. The electronic unit as claimed in claim 2 in that the electronic box (1) and the bushing (20) are arranged such that said electronic box is inclined by an angle of around 10° to 40° with respect to the longitudinal axis of the valve body (3).

8. The electronic unit as claimed in claim 3, characterized in that the electronic box (1) and the bushing (20) are arranged such that said electronic box is inclined by an angle of around 10° to 40° with respect to the longitudinal axis of the valve body (3).

9. The electronic unit as claimed in claim 2, characterized in that the bore (4) of the valve body (3) has, inside the abutment head (6), an internal segment having dimensions adapted to form an annular space around the second longitudinal section (19) of the tubular core (15).

10. The electronic unit as claimed in claim 9, characterized in that the means for assembling the bushing (20) of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (14, 26) for preventing relative translational movement of the bushing (20) relative to the valve body (3), these elements being formed on the sleeve (25) and inside the annular chamber (13).

11. The electronic unit as claimed in claim 9, characterized in that the means for assembling the bushing (20') of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (30, 31) for preventing relative rotational movement of the bushing (20') relative to the valve body (3), these elements being formed on the sleeve (25') and on the second elastic longitudinal section (19').

12. The electronic unit as claimed in claim 9, characterized in that the electronic box (1) and the bushing (20) are arranged such that said electronic box is inclined by an angle of around 10° to 40° with respect to the longitudinal axis of the valve body (3).

13. The electronic unit as claimed in claim 2, characterized in that the means for assembling the bushing (20) of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (14, 26) for preventing relative translational movement of the bushing (20) relative to the valve body (3), these elements being formed on the sleeve (25) and inside the annular chamber (13).

14. The electronic unit as claimed in claim 2, characterized in that the means for assembling the bushing (20') of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (30, 31) for preventing relative rotational movement of the bushing (20') relative to the valve body (3), these elements being formed on the sleeve (25') and on the second elastic longitudinal section (19').

15. The electronic unit as claimed in claim 1, characterized in that the means for assembling the bushing (20) of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (14, 26) for preventing relative translational movement of the bushing (20) relative to the valve body (3), these elements being formed on the sleeve (25) and inside the annular chamber (13).

16. The electronic unit as claimed in claim 15, characterized in that the abutment head (6) of the valve body (3) forms, around the periphery of the annular chamber (13), a cylindrical end-piece (10) having an external annular groove (11) housing a spring ring (12) for locking the assembly of the bushing (20) of the electronic box (1) on the abutment head (6), in order to clamp the electronic box (1) on the valve (2).

17. The electronic unit as claimed in claim 15, characterized in that the means for assembling the bushing (20') of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (30, 31) for preventing relative rotational movement of the bushing (20') relative to the valve body (3), these elements being formed on the sleeve (25') and on the second elastic longitudinal section (19').

18. The electronic unit as claimed in claim 15, characterized in that the electronic box (1) and the bushing (20) are arranged such that said electronic box is inclined by an angle of around 10° to 40° with respect to the longitudinal axis of the valve body (3).

19. The electronic unit as claimed in claim 1, characterized in that the means for assembling the bushing (20') of the electronic box (1) on the abutment head (6) of the valve body (3) comprise:

an annular chamber (13) formed within the abutment head (6) of the valve body (3) in the region of the outlet of the bore (4), a hollow sleeve (25) secured to the bushing (20) of the electronic box (1) and having dimensions adapted for lodging in the annular chamber (13), and mating elements (30, 31) for preventing relative rotational movement of the bushing (20') relative to the valve body (3), these elements being formed on the sleeve (25') and on the second elastic longitudinal section (19').

20. The electronic unit as claimed in claim 1, characterized in that the electronic box (1) and the bushing (20) are arranged such that said electronic box is inclined by an angle of around 10° to 40° with respect to the longitudinal axis of the valve body (3).

* * * * *